United States Patent Office 3,269,835
Patented August 30, 1966

3,269,835
PHOTOGRAPHIC MASKING SYSTEM UTILIZING A SPHERICALLY SYMMETRICAL LIGHT SCATTERING MASK
Clarence M. Flint, 77 Jerusalem Road, Cohasset, Mass.
Filed Feb. 12, 1964, Ser. No. 344,362
3 Claims. (Cl. 96—5)

This application is a continuation-in-part of application Serial No. 860,462 filed December 18, 1959, and now abandoned.

This invention relates to masks for use in the art of color separation and to improved methods for making color separation negatives.

One of the objects of this invention is to produce a single color correction mask for correcting the relative brightness and saturation errors of several color separation negatives.

A further object of this invention is to provide improved methods for correcting relative brightness and saturation errors of several color separation negatives by the use of a single color correction mask.

Another object of this invention is to provide a color separation mask which provides in a single mask the ability to control a range of contrast variation.

A still further object of this invention is to provide a color separation mask in which the procedure for producing the color correction mask is subject to a minimum of human error.

The foregoing and other objects of this invention will become apparent to those skilled in the art upon a consideration of the accompanying drawings taken in the light of the specification and considered with the appended claims. In the drawings:

Figure 1:
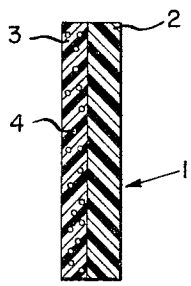
FIG. 1 is a cross sectional view through a correction mask made in accordance with a selected embodiment of this invention.

Before describing a specific embodiment of this invention, it is important to understand the problem to which this invention is directed. In the production of color separations in the past, the art has produced a plurality of color separation negatives either by the so-called direct or indirect separation techniques. One usual practice has been to make three color separation negatives, one for the cyan printer, another for the magenta printer and a third for the yellow printer. Frequently a black printer has been made in addition to the three color printers. It has been necessary to use color correction masks to overcome the inherent shortcomings of the filters used to make such separations, the inherent shortcomings of the colored printing inks used to reproduce the original subject matter, and the inherent shortcomings of the response curves of photographic films and papers to light of different colors. The net result of all these shortcomings is that the several color printers made from unmasked color separations always print some of their color in areas where the particular color does not belong.

These color correction masks of the prior art are themselves, subject to inherent shortcomings presented by the difficulty of coordinating the time of exposure, the light used for exposure, and the development techniques to obtain the desired degree of density in a silver emulsion. Another shortcoming of prior art color correction masks is that each of the several color separations usually requires a different degree of density in the mask, frequently requiring the artisan to produce more than one color correction mask for the processing of a single printer.

In the selected embodiment of this invention, applicant has discovered that a single color correction mask made in accordance with the techniques later to be described in this specification, where used as described, can be simply made for and used in each of several different color separations.

In the practice of this invention the color correction mask utilizes a spherically symmetrical light scattering process, rather than light blocking or Lambertian light scattering of prior art silver image masks, such as is disclosed in U.S. Patent No. 2,925,338 issued to Karl H. Schadlich for Photographic Masking Using the Callier Effect. In the color correction mask of the present invention the observed density differences with respect to various angles of illumination of the mask are roughly proportional to the tangent squared of the angle of illumination. This compares to a Lambertian light scattering of the Schadlich silver image where the density differences are proportional to the cosine squared of the angle of illumination. By using spherically symmetrical light scattering, a single color correction mask can be employed for masking the several color printers. Combined with a diffuse light source movable relative to the mask, any desired density within the capabilities of the mask can be obtained with a nominal effect on the less dense areas of the mask. This has not heretofore been possible with prior art masks. There a change in a desired density always has resulted in markedly affecting other less dense areas of the mask as well.

A preferred form of light scattering negative as used to make a color correction mask 1 of the selected embodiment of this invention, comprises a transparent backing member 2. This backing member 2 is made of a plastic material having high dimensional stability. In the selected embodiment of this invention, applicant uses a film which is provided with a backing member of polyethylene terephthalate. Such backing member may be obtained commercially from E. I. du Pont de Nemours & Co. under its trademark "Mylar." There is sandwiched to the backing member 2 a thermoplastic transparent layer 3 made of a plastic material having a high bursting strength and a softening point of about 200° F. In the selected embodiment of this invention the layer 3 comprises a vinylidene chloride derivative. The plastic layer 3 is thoroughly impregnated with a dyestuff which releases gas upon exposure to ultraviolet light and upon subsequent heating. In the selected embodiment of this invention the dyestuff used is a zinc salt of benzene diazonium chloride. Other salts of benzene diazonium chloride may also be used. Upon being exposed to ultraviolet and subsequent heating this dyestuff releases gas, forming tiny gaseous bubbles 4 in exposed areas of the thermoplastic layer 3.

A complete film of the type contemplated in this description is obtainable commercially from Kalvar Corporation, New Orleans, Louisana under its trademark "Kalvar."

In making the color correction mask with this film, an exposure is made with a light having a substantial ultraviolet component. This exposure activates the light sensitive layer 3 of the film in proportion to the amount of ultraviolet light reaching each particular area. Sources of such light include arc lamps, zenon lamps, mercury vapor lamps and the like. After the exposure is made, the film is then developed by passing it around a heated roll at 220° F. or by immersing it in boiling water for two seconds. For storage purposes, the developed film may then be fixed by exposing the material all over to ultraviolet light for a period not less than four times the length of the original exposure and allowing 24 hours for decay of gasses in the non-image areas. Such fixing is not required, however, during processing of a color separation provided the mask is not exposed again to ultraviolet light followed by elevated temperatures.

In the areas which are struck by ultraviolet light, the tiny gas bubbles 4 form light scattering centers. These areas scatter the light in a spherically symmetrical pattern when the film is used as a light transmission mask rather than absorbing the light or scattering it in accordance with the Lambertian cosine radiation law, as occurs in prior art masks. The angle of transmitted light through any given area of the mask varies as the mask moves toward and away from a source of diffuse light. Thus the recorded density on a photographic film in a camera for any given area for such a mask will be proportional to the distance between the masks and the diffuse light source.

The variation in apparent density of the mask as it is moved relative to the diffuse light source is roughly proportional to the tangent squared of the angle of illumination. This is contrasted with the Lambertian scattering of the prior art silver emulsion masks where the density varies as the cosine squared of the angle of illumination. This physical phenomenon makes it possible to vary the density of any given portion of the mask of the present invention without materially affecting low density areas of the mask. This has heretofore not been possible with the silver image masking techniques such as is disclosed by Schadlich.

Figure 4:
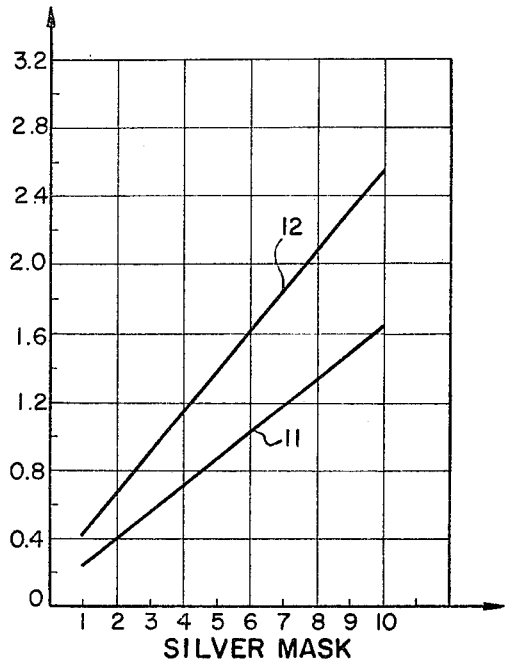
FIGS. 4 and 5 graphically illustrate the marked differences in diffuse and projection densities of a prior art silver emulsion mask compared to a mask made in accordance with this invention.

The reason for this remarkable result can be explained in connection with FIGS. 4 and 5. FIG. 4 plots the density of a standard silver step wedge mask when using diffuse and substantially collimated light. Curve 11 corresponds to the diffuse density of the mask. The projection density of the step wedge produces a curve 12 of higher density which is very nearly parallel to the diffuse density curve 11. These curves are essentially linear and for a change in density from .20 to .40 in the least dense portion of the wedge a corresponding change from 1.6 to 2.5 occurs in the most dense step of the wedge for variation of the transmission light from diffuse density to maximum projection density.

Figure 5:
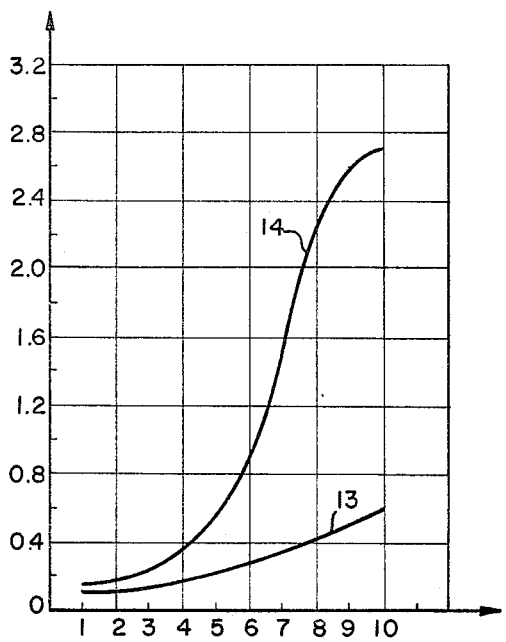

In contrast to this relationship FIG. 5 illustrates the diffuse and projection densities of the mask of the present invention. A mask of FIG. 1 was made using the techniques described hereinabove by making a contact print of the standard ten step wedge of FIG. 4. The diffuse and projection density curves 13 and 14 respectively, are not linear. The difference in density for the least dense step of the wedge is from about .1 to .15 as the light becomes less diffuse. Whereas the variation in density for the most dense step of the wedge is from .6 to 2.7 as one moves from the diffuse density to the projection density curve. Thus, for an extremely wide variation in density at the most dense end of the wedge very little change in density occurs in the less dense portions of the wedge. This phenomena does not occur with the silver mask of FIG. 4 as one moves the relative position of the light source.

As further illustrated in FIGS. 4 and 5 the total possible variation in the most dense step of the wedge using the mask of the present invention is over twice as great as that possible with the silver emulsion mask of FIG. 4. At the same time for this greater possible variation in density in the most dense step of the wedge one need accept an increase only 25% as great in the least dense step of the wedge for the improved mask as compared to the silver mask described herein. Thus, merely by varying the distance between mask and diffuse light source a single mask of the present invention is effective in color correcting several separation negatives, whereas a single silver emulsion mask is not.

If the mask is slowly removed from the diffusing screen and brought toward the eye of the viewer, the light striking the transparency becomes more nearly parallel and strikes the mask at an angle that is close to the normal. In this case, a substantially large portion of the light is scattered in a backward direction or at an angle larger than that of the viewing angle so that it does not strike the eye of the viewer. The apparent contrast in this instance is much higher than in the first instance because the amount of transmitted incident light scattered outside of the angle of viewing is proportional to the density in the mask and consequently there is a much greater increase in apparent density in areas of originally higher density than there is in areas of originally lower density.

It will be recognized that the angle of incidence of light striking the mask can be altered by other means which will become apparent to those skilled in the art upon an understanding of the selected embodiment of this invention.

In making color separation negatives by use of the foregoing mask with the direct separation process, the selected embodiment of this invention is used in the camera now to be described with reference to FIG. 2 and FIG. 3.

The correction mask 1 is placed in a projection camera between a lens 5 and a diffuse light source 6. A color transparency 7 is mounted in contact with the correction mask 1 on the side of the correction mask facing the light source 6. A color filter 8 is mounted against the color transparency 7 on the side of the color transparency facing the light source 6. The resulting image is projected through the lens 5 and a half-tone screen 9 upon a sensitive film 10 to make a color separation half-tone negative.

Figure 2:
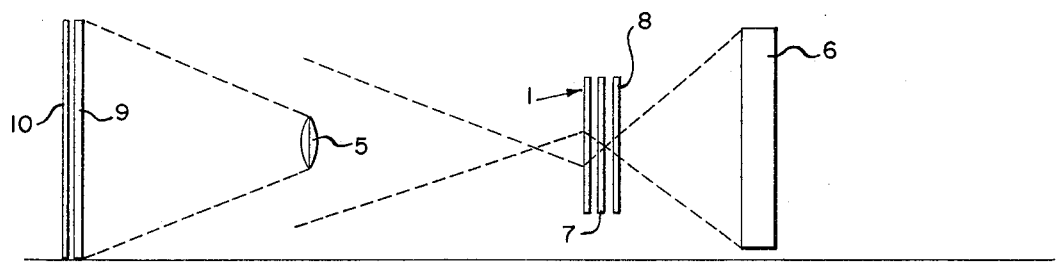
FIG. 2 is a diagrammatical longitudinal view through a projection camera used in the selected embodiment of this invention showing the resulting scatter of light for one position.
Figure 3:
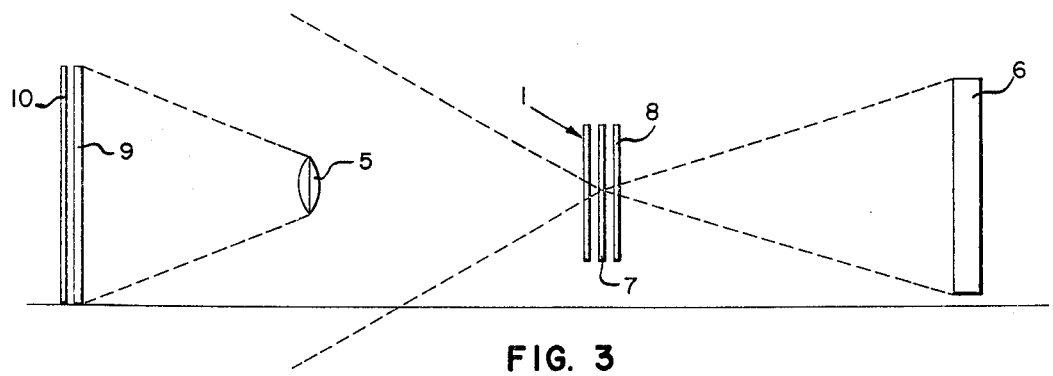
FIG. 3 is a diagrammatical longitudinal view through a projection camera used in the selected embodiment of this invention showing the resulting scatter of light for another position.

It will be noted from examining FIGS. 2 and 3 that the diffuse light source 6 may be moved toward and away from the color correction mask 1. When the diffuse light source 6 is close to the color correction mask 1 as shown in FIG. 2, there is a relatively large angle of incidence of light and a relatively large percentage of the light is scattered toward the lens 5, whereas when the diffuse light source 6 is moved away from the color correction mask 1 as shown in FIG. 3, there is a relatively small angle of incidence of light and a smaller percentage of the light is scattered toward the lens 5.

A different color filter 8 is used for each color separation half-tone negative in the manner which is usually practiced in the art of making such half-tone color separation negatives. However, as distinguished from prior art practice, the diffuse light source acting in combination with the color correction mask 1 is shifted back and forth to obtain whatever amount of color correction the operator may desire for the particular color printer being made. In actual practice it has been found that the diffuse light source 6 is brought closer to the color correction mask 1 for increasing the contrast range and is moved further away from the mask 1 to reduce the contrast. The described procedure eliminates the need for experienced and highly skilled operators. If one misjudges and prepares a mask which is too thin or too dense, new masks need not be prepared until by trial and error a suitable one has been made. With the present invention the operator can prepare a mask for each color separation and, even though each may not be as precise as one would like, the operator can adjust its effect simply by moving the light source.

It will become apparent to those skilled in the art that the light scattering color correction mask used in the selected embodiment of this invention has been selected for purposes of illustration only and that a spherically symmetrical light scattering mask may be made of materials other than those described in this specification. It will also be understood that the specific arrangement and location of the various elements in the projection camera are given for purposes of illustration only and that other forms of camera providing means for adjusting the spacing of the light scattering color correction mask and the diffuse light source may be used. Alternative forms of arrangement and substitutions of equivalents will become apparent to those skilled in the art upon an understanding of the specification and the practice of the invention, the invention being defined in the accompanying claims.

I claim:

1. A method of making color separation negatives for any predetermined color from a color transparency comprising the step of making a color correction mask from said transparency carrying light scattering centers for scattering light in a spherically symmetrical pattern; mounting a color transparency adjacent to said mask; mounting a filter for said color adjacent to said color transparency; transmitting light from a diffuse light source only through said filter, color transparency and mask onto a photosensitive film; and varying the distance between said mask and said diffuse light source to obtain variations in density in said mask.

2. A method according to claim 1 wherein said color correction mask is made by transmitting light having a substantial ultraviolet component through said color transparency upon a transparent film coated with a plastic material having high bursting strength and containing in solution a dyestuff which releases gas upon exposure to ultraviolet light and subsequent heating; and developing said film by heating to an elevated temperature to form tiny light scattering gas bubbles.

3. A method for color correcting color separation negatives and the like, comprising the step of making a color correction mask carrying light scattering centers for scattering light in a spherically symmetrical pattern, the step of placing next to said mask a color separation negative, the step of exposing a photosensitive film with diffuse light only transmitted through said color correction mask and separation negative, and the step of varying the distance between said mask and separation negative and the source of said diffuse light to obtain variations in density in said mask.

References Cited by the Examiner
UNITED STATES PATENTS

| | | | |
|---|---|---|---|
| 2,668,762 | 2/1954 | Rubinstein | 96—116 |
| 2,925,338 | 2/1960 | Schadlich | 96—6 |
| 3,032,414 | 5/1962 | James et al. | 96—91 |
| 3,120,437 | 2/1964 | Lindquist | 96—49 |

NORMAN G. TORCHIN, *Primary Examiner.*

J. T. BROWN, *Assistant Examiner.*